(12) United States Patent
Hill et al.

(10) Patent No.: US 11,150,429 B2
(45) Date of Patent: Oct. 19, 2021

(54) OPTICAL FIBER DISTRIBUTION CABINET

(71) Applicant: Clearfield, Inc., Minneapolis, MN (US)

(72) Inventors: John P. Hill, Oak Grove, MN (US); Randy T. VanHorn, Princeton, MN (US); Walter E. Power, II, Jordan, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 16/875,568

(22) Filed: May 15, 2020

(65) Prior Publication Data
US 2020/0278513 A1    Sep. 3, 2020

Related U.S. Application Data

(62) Division of application No. 16/402,497, filed on May 3, 2019, now Pat. No. 10,884,209.

(60) Provisional application No. 62/670,328, filed on May 11, 2018.

(51) Int. Cl.
*G02B 6/44* (2006.01)
*G02B 6/38* (2006.01)
*G02B 6/46* (2006.01)

(52) U.S. Cl.
CPC ......... *G02B 6/4452* (2013.01); *G02B 6/3825* (2013.01); *G02B 6/3879* (2013.01); *G02B 6/3897* (2013.01); *G02B 6/4446* (2013.01); *G02B 6/46* (2013.01)

(58) Field of Classification Search
CPC .. G02B 6/4452; G02B 6/3825; G02B 6/3879; G02B 6/3897; G02B 6/4446; G02B 6/46
USPC ........................................................ 385/135
See application file for complete search history.

(56) References Cited

U.S. PATENT DOCUMENTS 7,261,472 B2 * 8/2007 Suzuki ................. G02B 6/3807
                                                                    385/60
2018/0074275 A1 * 3/2018 Thompson ........... G02B 6/4454

* cited by examiner

*Primary Examiner* — Jerry M Blevins
(74) *Attorney, Agent, or Firm* — Troutman Pepper Hamilton Sanders LLP

(57) ABSTRACT

A latchless adapter comprising an adapter frame, a ferrule positioning portion, and a spring clip located on an exterior of the adapter frame and configured to couple the latchless adapter to an external frame. The ferrule positioning portion may separate the interior of the latchless adapter into two compartments configured to receive respective connectors.

4 Claims, 22 Drawing Sheets

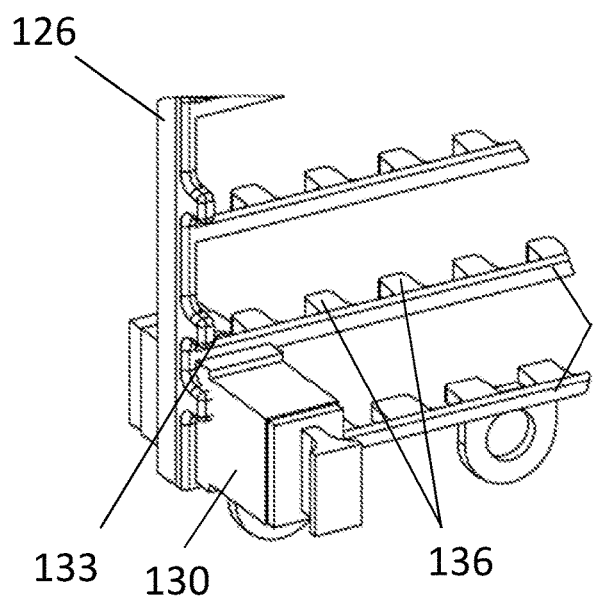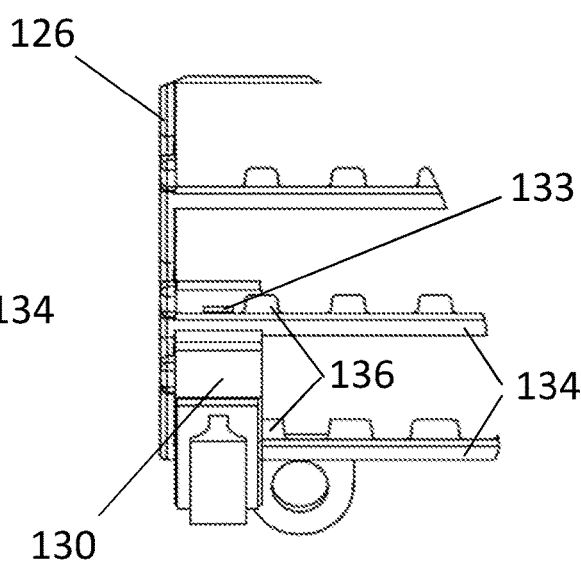
FIG. 7D
FIG. 7E

OPTICAL FIBER DISTRIBUTION CABINET

CROSS REFERENCE TO RELATED APPLICATION

This application is a divisional application of and claims priority to U.S. patent application Ser. No. 16/402,497 filed May 3, 2019 which claims the benefit of priority under 35 U.S.C. 119(e) to U.S. Provisional Patent Application 62/670,328, filed on May 11, 2018, the contents of both of which are incorporated herein by reference in their entirety.

TECHNICAL FIELD

The present disclosure relates generally to optical fiber management systems, and more specifically to cabinets housing various components of fiber optic communication networks.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

Optical fiber connection apparatuses, such as outside plant distribution cabinets, distribution frames, pedestals, patch panels, and splice terminations are used wherever the interconnection or cross-connection of multiple optical fibers is required. For example, optical fiber cable comprising numerous individual fibers may enter a distribution cabinet, fiber frame, or patch panel for connection to the individual optical fibers that split off to provide service to homes or businesses. Often, it is desirable that such optical fiber management, and/or optical fiber connection apparatus, allow for the interconnection of a large number of individual fibers in as small a space as possible (e.g., high density connections). It is further desirable to reduce space requirements and deployment costs related to optical fiber management systems.

SUMMARY

The present disclosure is directed to optical fiber connection and distribution cabinets and components therein. In one embodiment, there is provided an optical fiber cabinet comprising a housing having a front opening for accessing an interior of the cabinet, a high density distribution field including a bulkhead having a plurality of faceplates, each faceplate configured to receive a plurality of high density adapters, and a staging area configured to receive at least one staging plate, the at least one staging plate including a frame having a plurality of pins, wherein each pin is configured to couple to a latchless adapter.

In some embodiments, the frame of the staging plate may include a plurality of rows. The plurality of pins may be positioned equidistantly along each of the plurality of rows. In some embodiments, the staging plate may further comprise at least one of a foam cradle and a foam strip around the frame. In some embodiments, the staging plate may further comprise at least one tab configured to receive a fastener.

In various embodiments, the optical fiber cabinet may further comprise a latchless adapter. In one embodiment, the latchless adapter may include an adapter frame without connector locking clips, a spring clip configured to couple to one of the plurality of pins of the staging plate, and a ferrule positioning portion. In some embodiments, the latchless adapter may comprise a removable cap. In some embodiments, the ferrule positioning portion of the latchless adapter may comprise a first portion and a second portion. Each of the first portion and the second portion may comprise a cylindrical portion with a flat portion at an end of the cylindrical portion. The flat portion of the first portion and the flat portion of the second portion may be configured to mate. In other embodiments, the ferrule positioning portion may be a single integral piece.

In some embodiments, the staging area of the cabinet may be located on the bulkhead. In some embodiments, the bulkhead may be tilted relative to the front opening, thereby creating a storage space at a rear portion of the cabinet. In some embodiments, the cabinet may comprise a splice tray within the storage space. In some embodiments, the housing of the cabinet may comprise a side panel having an opening configured to provide access to the storage space.

In some embodiments, the optical fiber cabinet may comprise at least one splitter cage. The splitter cage may be a universal splitter cage, configured to hold any splitter having a size of about 115 mm× about 140 mm× about 10 mm.

Some embodiments of the cabinet may be configured to couple to a separate riser having a ground locate box on the riser. The cabinet may further comprise a vent and a filter hidden in a roof of the cabinet. For example, the cabinet may comprise a top cover positioned over a top panel of the housing, wherein the top panel comprises a filter compartment and vent holes.

According to another aspect, there is provided a latchless adapter comprising an adapter frame without connector locking clips, a ferrule positioning portion, and a spring clip located on an exterior of the adapter frame and configured to couple the latchless adapter to an external frame. In some embodiments, the ferrule positioning portion may be positioned within an interior of the latchless adapter, thereby separating the interior into a first compartment at a first end of the latchless adapter and a second compartment at a second end of the latchless adapter, each of the first and the second compartments configured to receive a respective connector. In some embodiments, the ferrule positioning portion may comprise a first portion and a second portion, each of the first portion and the second portion comprising a cylindrical portion with a flat portion at an end of the cylindrical portion. The flat portion of the first portion and the flat portion of the second portion may be configured to mate. In some embodiments, the latchless adapter may comprise a removable cap.

BRIEF DESCRIPTION OF THE FIGURES

FIG. 7D is a perspective view of a latchless adapter coupled to the frame of the staging plate of FIG. 5 according to aspects of the present disclosure;

FIG. 7E is another perspective view of the latchless adapter coupled to the frame of the staging plate of FIG. 5 according to aspects of the present disclosure;

DETAILED DESCRIPTION

Aspects of the present disclosure provide optical fiber connection and distribution cabinets. Various embodiments of the cabinets provide a high density distribution field. Various embodiments may provide a universal splitter cage and may have a staging plate with latchless adapters. Various embodiments of the cabinets may provide access to the interior from a side of the cabinet, and may provide a ground locate box on a riser. Various embodiments also provide a vent and filter hidden in the roof of the cabinet.

The present disclosure is not limited in terms of the particular embodiments described in this application, which are intended as illustrations of various aspects. Many modifications and variations can be made without departing from its spirit and scope, as will be apparent to those skilled in the art.

Figure 1:
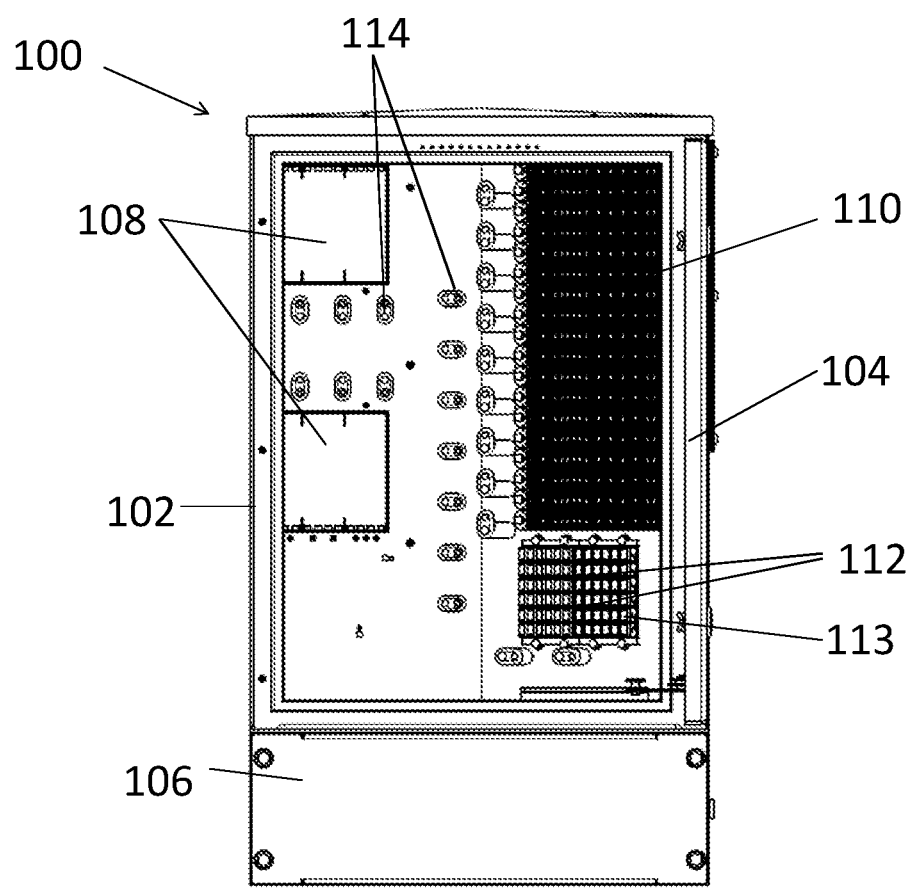
FIG. 1 is a perspective view showing the front of one embodiment of a cabinet according to aspects of the present disclosure.

FIG. 1 is a perspective view showing the front of one embodiment of a cabinet 100 according to aspects of the present disclosure. The cabinet 100 has a housing 102 and a hinged door 104 coupled to the housing. In other embodiments, the cabinet need not have a hinged door or may have a door coupled to the housing by another means. The cabinet 100 also has a riser 106. The riser 106 may be separate from the cabinet housing 102 and coupled to it.

The cabinet 100 includes splitter cages 108. The cabinet 100 also includes a distribution field 110 housing high density adapters, staging plates 112 located at staging area 113, and a plurality of pins 114 for routing and management of optical fibers.

Figure 2:
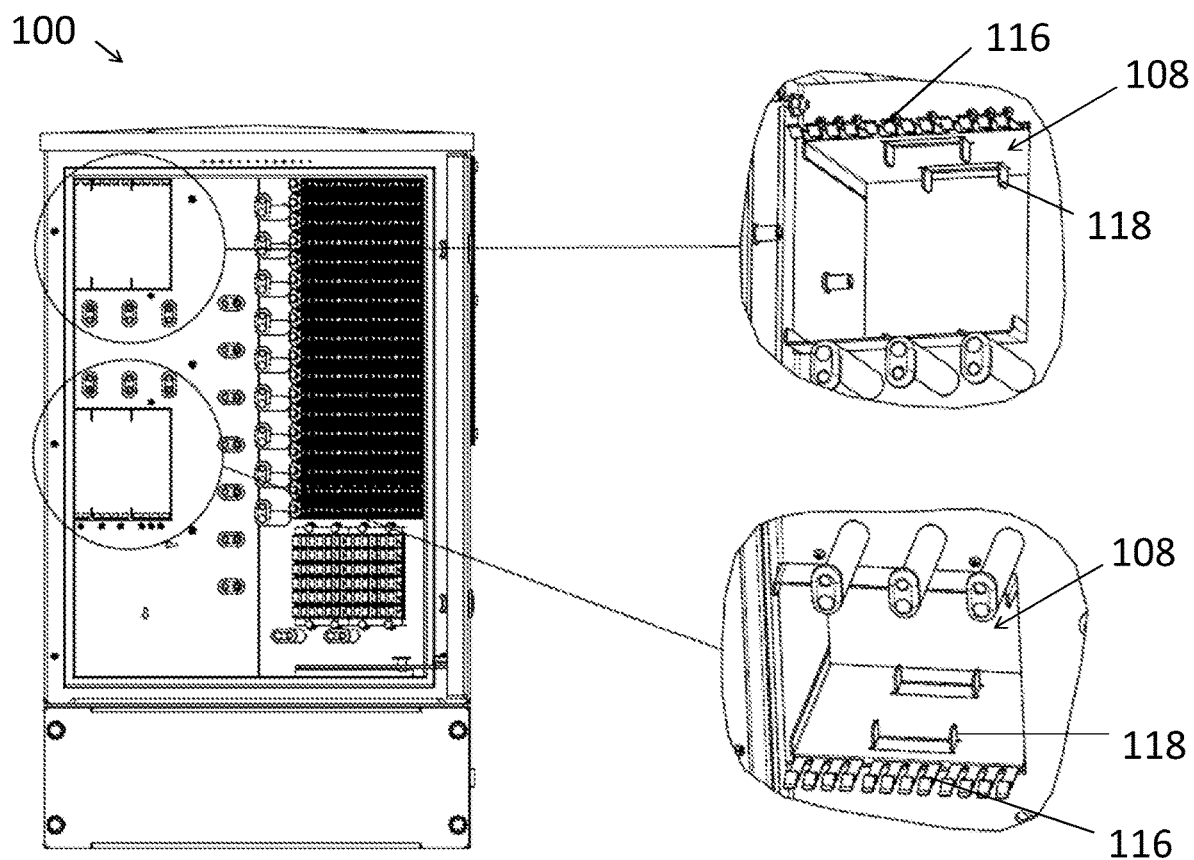
FIG. 2 is a schematic diagram showing the splitter cages of the cabinet of FIG. 1 according to aspects of the present disclosure.

FIG. 2 is a schematic diagram showing the splitter cages 108 of the cabinet 100. In this embodiment, the splitter cages 108 are universal splitter cages, configured to uniquely hold any splitter having a size of about 115 mm× about 140 mm× about 10 mm. In other embodiments, the splitter cages may be configured to accommodate other splitter sizes. Each of the splitter cages 108 is configured to hold 12 splitters. In other embodiments, a different number of splitters may be accommodated. The splitter cage 108 includes a plurality of clips 116. Each clip 116 is configured to hold a respective splitter. The clips 116 may be spring steel clips or other types of clips made of different materials. The splitter cage 108 further comprises metal sheets 118 and foam. As shown in FIG. 2, the clips 116 may be coupled to the metal sheet 118.

Figure 3:
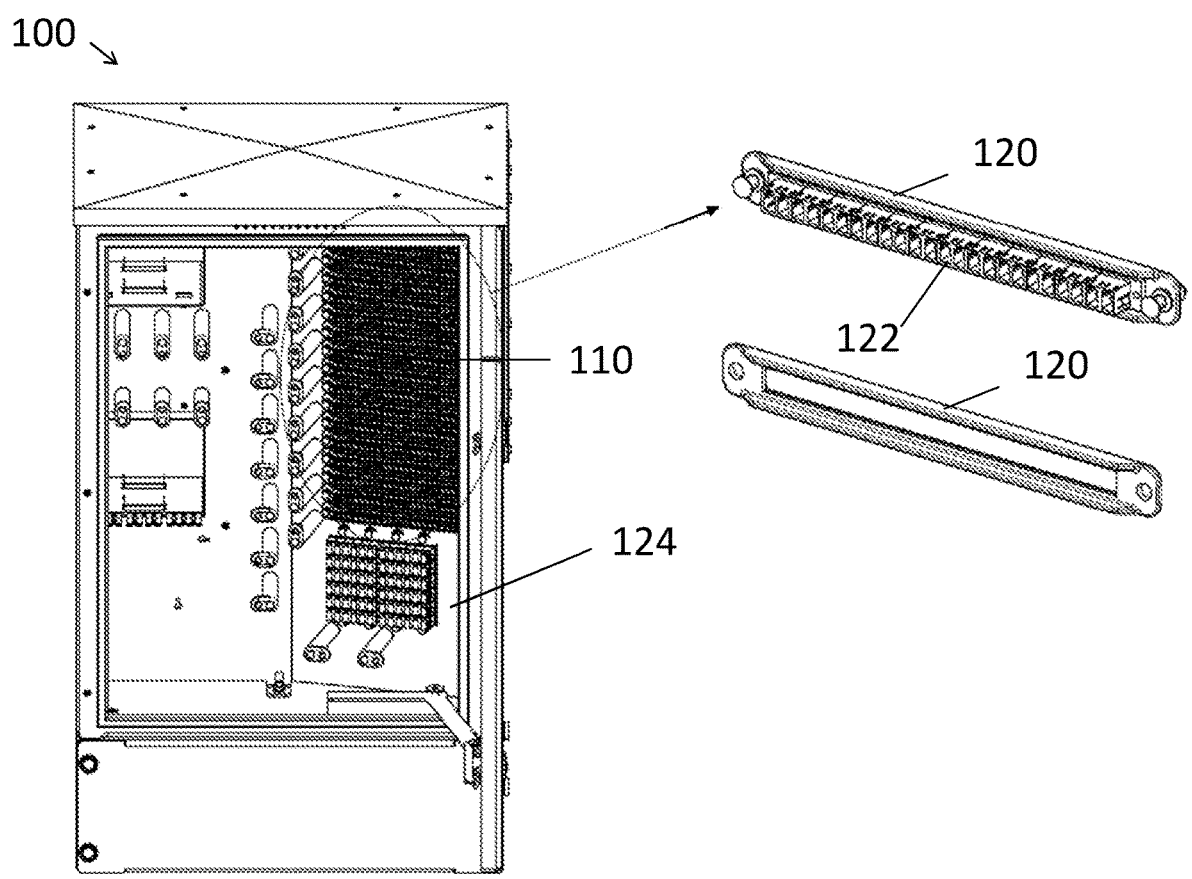
FIG. 3 is a schematic diagram showing the high density distribution field comprising a faceplate housing adapters, and further showing an empty faceplate according to aspects of the present disclosure.

FIG. 3 is a schematic diagram showing the high density distribution field 110 comprising a plurality of faceplates 120. Each of the faceplates 120 includes a plurality of high density adapters 122. In one embodiment, the adapters 122 may be dual LC gangable adapters. Other types of adapters may be used in other embodiments. FIG. 3 further shows an empty faceplate 120. The faceplates 120 are positioned in a bulkhead 124 that is angled to allow for easier access to adapters 122 as well as space in the rear of the bulkhead. The faceplates 120 may be positioned horizontally relative to the face of the cabinet in other embodiments (i.e., not angled). The faceplate 120 and the adapters 122 can be integrated as a single molded element that is positioned in the bulkhead. The bulkhead 124 can comprise faceplates 120 and/or adapters 122 as a single molded element.

Figure 4:
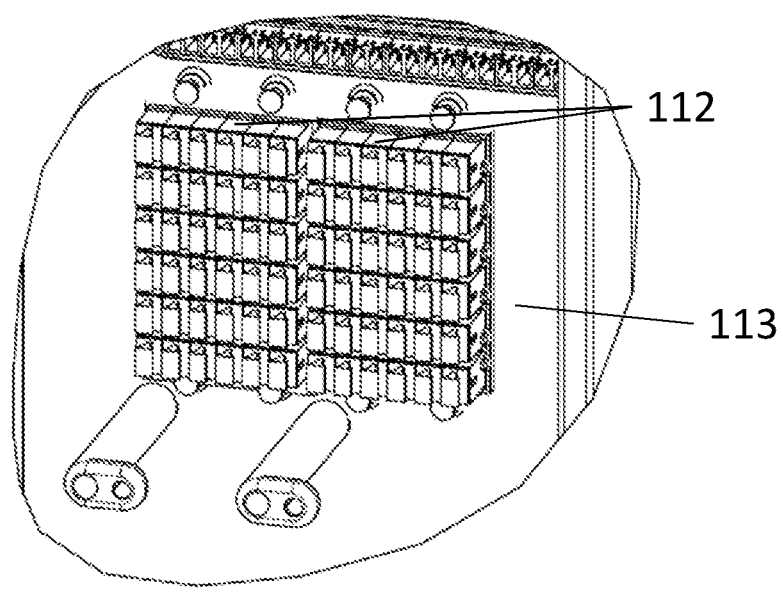
FIG. 4 is a schematic diagram showing one embodiment of staging plates housed in the cabinet of FIG. 1 according to aspects of the present disclosure.

FIG. 4 is a schematic diagram showing one embodiment of staging plates 112 housed in the cabinet 100. Specifically, the staging plates 112 are housed within the staging area 113 of the cabinet 100. The staging plates 112 are positioned vertically next to each other. In other embodiments, the staging plates 112 may be configured differently, such as being placed horizontally with one plate above the other. The configuration of staging plates may depend on the application and the configuration of the staging area of the cabinet. The staging plates 112 are configured for ease of installation and enhanced density capabilities.

Figure 5:
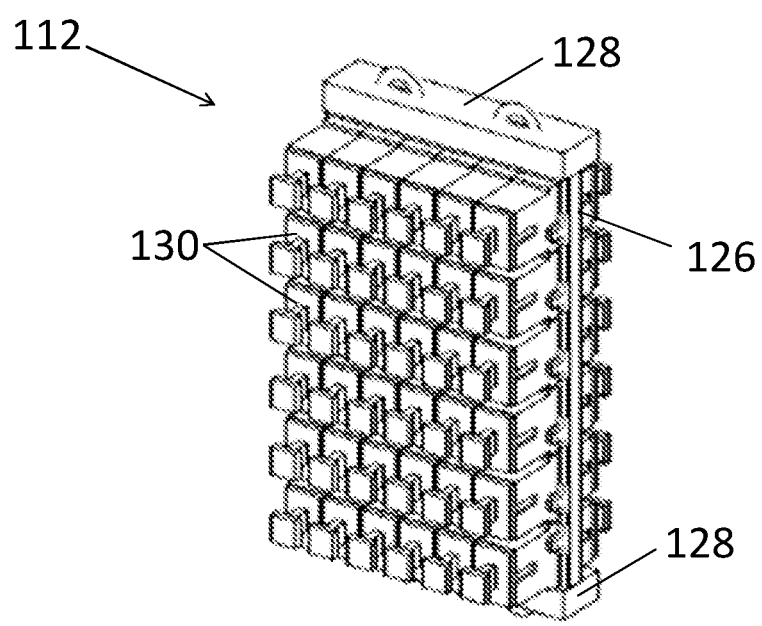
FIG. 5 is a perspective view of one embodiment of a staging plate according to aspects of the present disclosure.

FIG. 5 is a perspective view of one embodiment of a staging plate 112. The staging plate 112 comprises a frame 126, foam strips 128 and a plurality of compartments, or latchless adapters 130. In this embodiment, there are 36 SC/APC latchless adapters. The latchless adapters comprise basic adapter frames that do not include connector locking clips, such that a connector can be inserted into the latchless adapters and remain in position, but is not locked into place such as would be the case in a standard and known adapter. In other embodiments, a different number or type of latchless adapters may be utilized. In other embodiments, basic off-the-shelf adapters may be utilized.

Latchless (that is, non-latching) adapters have several advantages over standard adapters. For example, latchless adapters allow for quick installation and removal of splitter legs in high density cabinets. Connectors that couple to a latchless adapter may be held in only by a friction fit and may easily be removed by pulling on the back side of the boot of the connectors. This is in contrast to standard connectors that must be unlatched by hand, and may not be unlatched by pulling on the boot. In standard connectors and adapters, however, a hand may not have access to the latching mechanism, and therefore access to splitter legs can be limited and restricted. Further advantages of latchless adapters include improvement of packaging and the way splitter legs are stored in cabinets. Further, latchless adapters allow for temporary mating of connectors for indiscrete testing and port verification.

Figure 6:
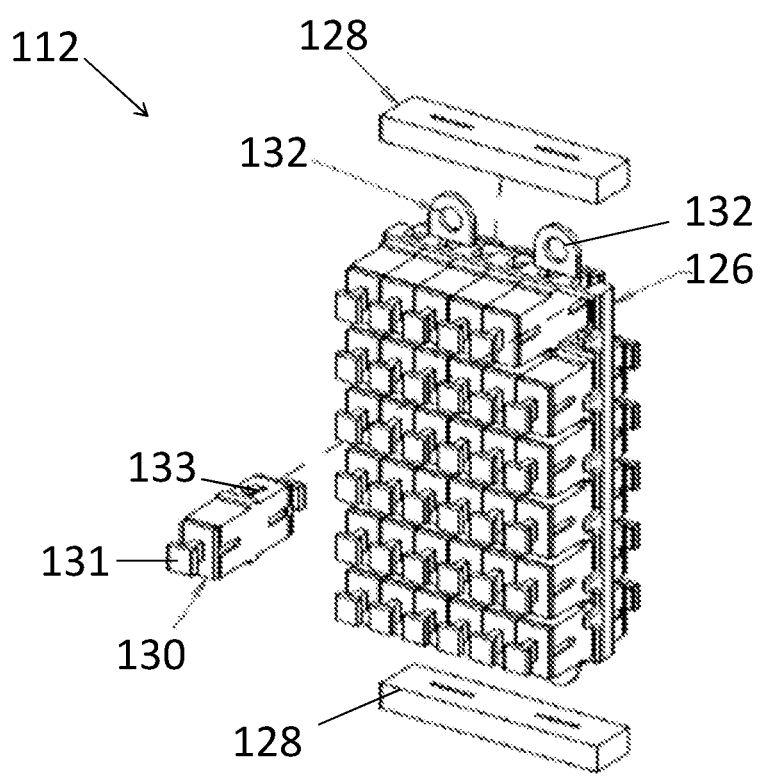
FIG. 6 is a partially exploded perspective view of the staging plate of FIG. 5 according to aspects of the present disclosure.

FIG. 6 is a partially exploded perspective view of the staging plate 112. The foam strips 128 have been removed, further showing tabs 132. The tabs 132 may be located at each end of the frame 126 and may be configured for foam locating and for optional push pull fasteners. In some embodiments, the tabs 132 may be clipped off to allow fitting the staging plate within various staging areas of a cabinet. An adapter 130 is shown pulled out from the staging plate 112. The adapters 130 have caps 131 covering the ends of the adapters. The adapters 130 also have spring clips 133 for coupling the adapters to the frame 126. The spring clips 133 may be metal spring clips. The staging plate 112 is configured to hold any terminated fiber assembly connector end or unused splitter tails. The foam 128 can be included for insertion of the staging plate 112 into the cabinet 100, or it may be removed before positioning of the staging plate 112.

Figure 7A:
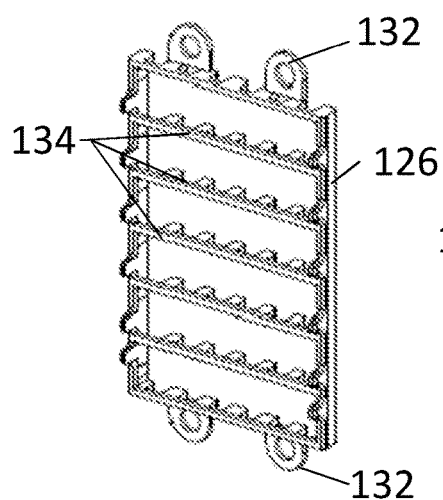
FIG. 7A is a perspective view of the front of the frame of the staging plate of FIG. 5 according to aspects of the present disclosure.
Figure 7B:
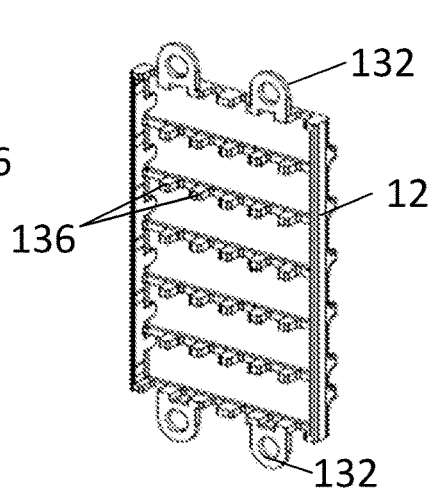
FIG. 7B is a perspective view of the back of the frame of the staging plate of FIG. 5 according to aspects of the present disclosure.
Figure 7C:
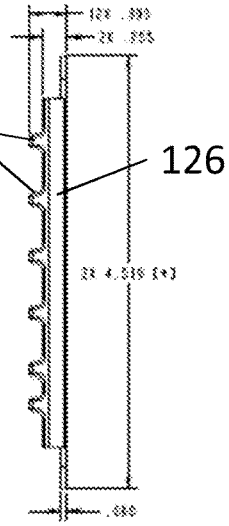
FIG. 7C is a side view of the frame of the staging plate of FIG. 5 according to aspects of the present disclosure.
Figure 7F:
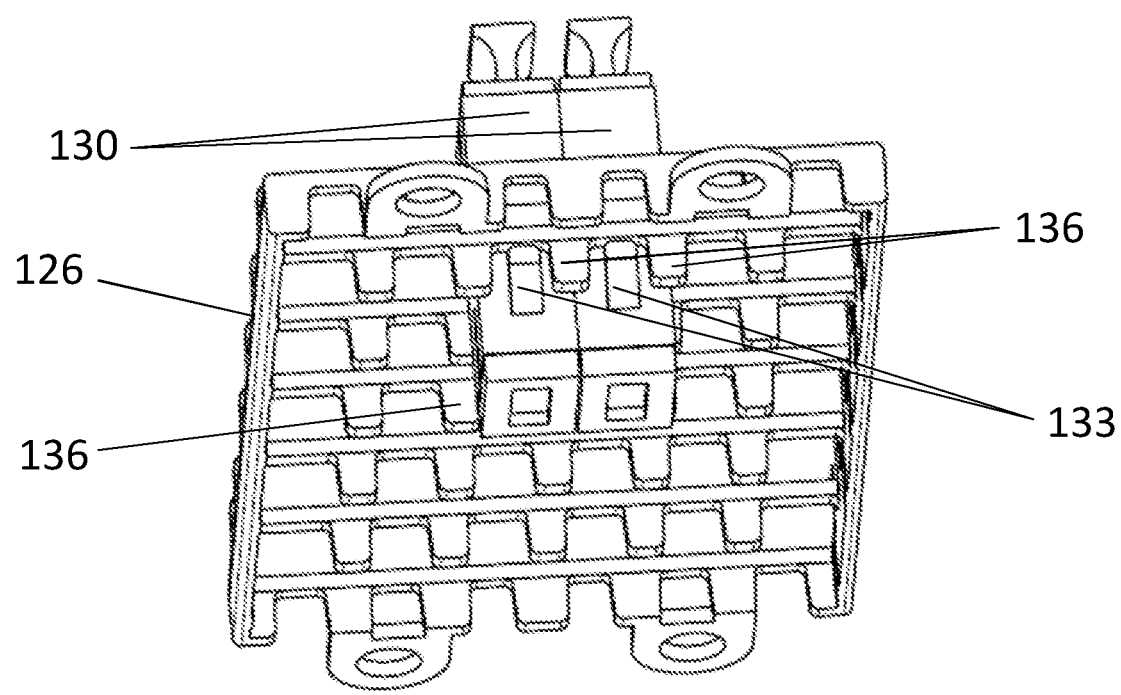
FIG. 7F is a perspective view of two side by side latchless adapters positioned within the frame of the staging plate of FIG. 5 and aligned with each other according to aspects of the present disclosure.

FIG. 7A is a perspective view of the front of the frame 126 of the staging plate 112 and FIG. 7B is a perspective view of the back of the frame 126. In various embodiments, the frame 126 may be made of a plastic material or any other suitable material. The frame 126 includes tabs 132. The frame 126 further comprises a plurality of rows 134, each row having a plurality of pins 136 protruding therefrom. FIG. 7C is a side view of the frame 126, showing the protruding pins 136. The pins 136 are used to align the latchless adapters 130 with one another as shown in FIG. 6, and prevent excess movement horizontally across the row 134. Various embodiments of the latchless adapters 130 may have spring clips 133 as shown for example in FIG. 6. In some embodiments, each latchless adapter 130 may include two metal spring clips 133 disposed on opposite sides of the adapter. In other embodiments, a different number or configuration of clips may be used. FIG. 7D shows a latchless adapter 130 inserted into and coupled to the frame 126 of the staging plate 112, between two rows 134. The outside spring clip 133 on the latchless adapter 130 uses the pin 136 on the staging plate 112 to contain its movement. The pins 136 hold adapter movement along with the metal spring clips 133. FIG. 7E shows another view of the latchless adapter 130 coupled to the frame 126 between two rows 134 with two spring clips 133 positioned at opposite ends of the adapter. The latchless adapter 130 slides into position and then is held there by metal spring clips 133 and pins 136. FIG. 7F shows two side by side latchless adapters 130 positioned within the frame 126 of the staging plate 112 and aligned with each other.

Figure 8A:
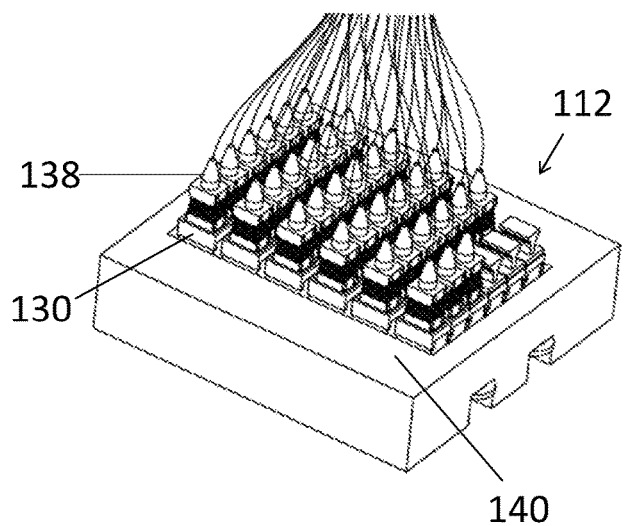
FIG. 8A is a perspective view of a staging plate having a foam cradle according to aspects of the present disclosure.
Figure 8B:
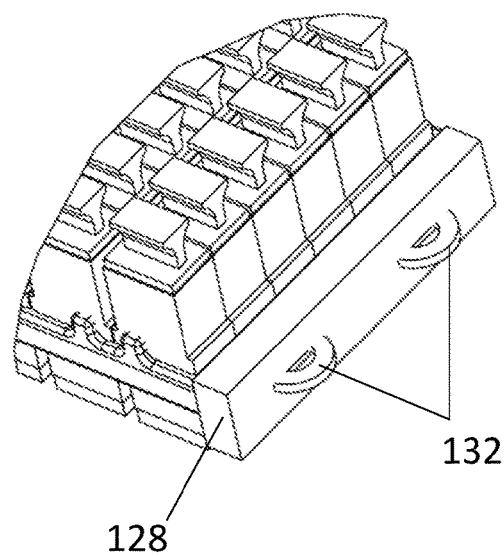
FIG. 8B is a partial view of a staging plate having a foam strip according to aspects of the present disclosure.

FIG. 8A is a perspective view of a staging plate 112 housing a plurality of adapters 130. Each of the adapters 130 has a respective connector 138 coupled thereto. In this embodiment, the staging plate 112 is surrounded by a foam cradle 140. In other embodiments, as shown for example in FIG. 8B (also in FIGS. 5 and 6), the staging plate 112 may have foam strips 128 that slide over the tabs 132 on each end of the staging plate. The foam cradle 140 and foam strips 128 may be weather resistant EPDM foam. In various embodiments, the foam cradle 140 may be removed from the staging plate 112 and replaced by foam strips 128 by sliding the foam strips over the tabs 132. This allows the staging plate to be reconfigured to fit different embodiments of cabinets. In one example, where a single splitter is used, a single staging plate may be installed horizontally, that is oriented along the long edge, with foam cradle in place, into the staging area of a cabinet. In another example, where two splitters are used, the foam cradle may be removed from staging plates and replaced by foam strips. Two staging plates with foam strips may be installed vertically, that is oriented along the short edge, within the staging area of a cabinet, as shown for example in FIG. 4. In yet another example, two staging plates, each having a respective foam cradle, may be installed horizontally in the staging area of a cabinet. Other configurations of staging plates with either foam cradles or foam strips may be used depending on the type of application and the staging area of the cabinet.

Figure 9:
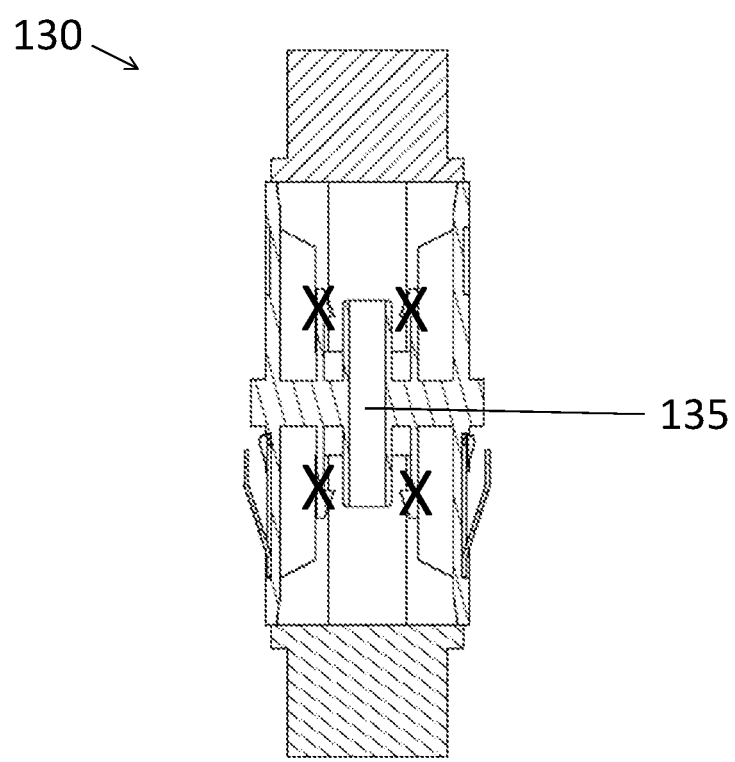
FIG. 9 shows an adapter with latches crossed out to form one embodiment of a latchless adapter according to aspects of the present disclosure.

FIG. 9 shows a latchless adapter 130. The latchless adapter 130 does not have internal latching hooks or connector locking clips. The latchless adapter 130 comprises a ferrule positioning portion 135 and at least one compartment to accept a respective connector therein. The connector stays inside the latchless adapter 130 through friction. In one embodiment, the friction may be roughly the same amount as standard adapters that latch. The latchless adapter allows pulling the connector out of the adapter more easily than a standard adapter having a latch. For example, the connector may be pulled out of the latchless adapter by pulling the boot of the connector.

Figure 10A:
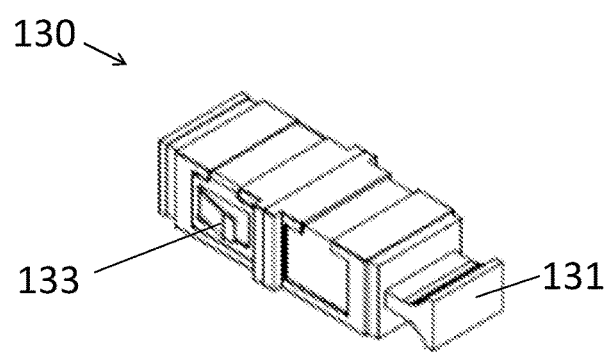
FIG. 10A is a perspective view of one embodiment of a latchless adapter according to aspects of the present disclosure.

FIG. 10A is a perspective view of one embodiment of a latchless adapter 130. The adapter 130 has a cap 131 for covering the end of the adapter when not in use. The latchless adapter 130 has at least one spring clip 133 for coupling the adapter to a staging plate as discussed above in relation with FIGS. 7A to 7F.

Figure 10B:
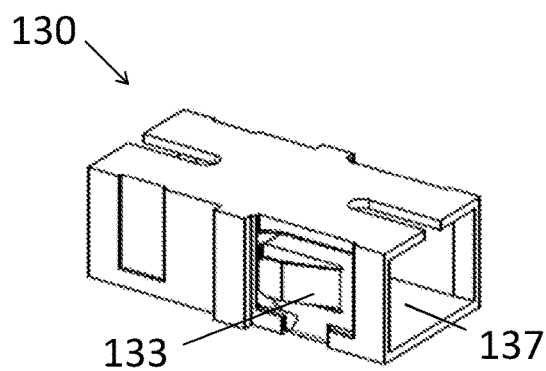
FIG. 10B is a perspective view of one embodiment of a latchless adapter according to aspects of the present disclosure.
Figure 10C:
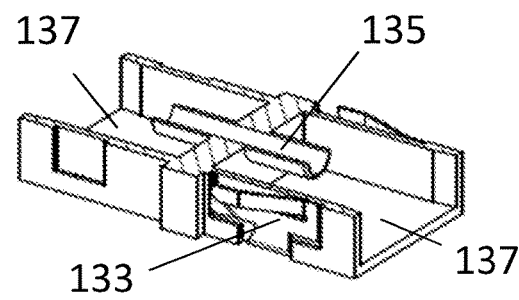
FIG. 10C is a perspective cross-sectional view of the latchless adapter of FIG. 10B according to aspects of the present disclosure.
Figure 10D:
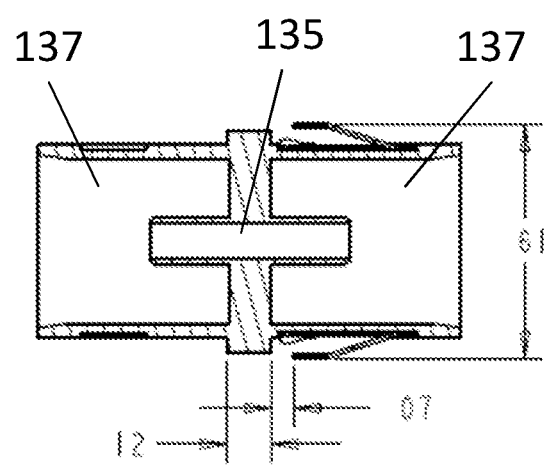
FIG. 10D is a top view of the latchless adapter cross-section of FIG. 10C according to aspects of the present disclosure.

FIG. 10B is a perspective view of the latchless adapter 130, further showing a compartment 137 configured to receive a connector therein. FIG. 10C is a perspective cross-sectional view of the latchless adapter 130, further showing the interior of the adapter, and FIG. 10D is a top view of the latchless adapter cross-section of FIG. 10C. Specifically, FIGS. 10C and 10D show two compartments 137, each configured to receive a respective connector. The latchless adapter 130 further includes a ferrule positioning portion 135 that extends to each compartment 137. The ferrule positioning portion 135 may be configured to align the ferrules of the respective connectors received within the adapter 130. The ferrule positioning portion 135 may have a cylindrical shape, as shown in the embodiment of FIG. 10C.

Figure 10E:
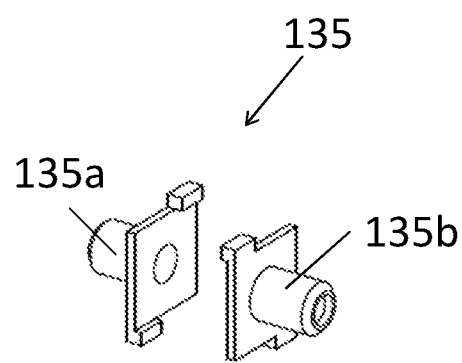
FIG. 10E is a perspective view of the ferrule positioning portion of the latchless adapter of FIG. 10D according to aspects of the present disclosure.

FIG. 10E is a perspective view of the ferrule positioning portion 135 of the latchless adapter 130. In this embodiment, the ferrule positioning portion 135 comprises two portions 135a and 135b that may be coupled together. Each of the portions 135a and 135b may have a respective cylindrical portion and a flat portion at one end thereof. The ends of the portions 135a and 135b may be mated together to form the ferrule positioning portion 135. In one embodiment, the portions 135a and 135b may be glued by an adhesive. In other embodiments, the portions 135a and 135b may be coupled by other means such as a latch or clip. In some embodiments, the ferrule positioning portion 135 may be a single integral piece.

Figure 11A:
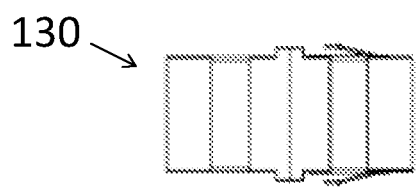
FIG. 11A is a top view of one embodiment of a latchless adapter according to aspects of the present disclosure.
Figure 11B:
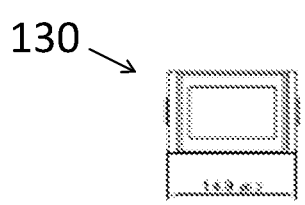
FIG. 11B is a rear view of the latchless adapter of FIG. 11A according to aspects of the present disclosure.
Figure 11C:
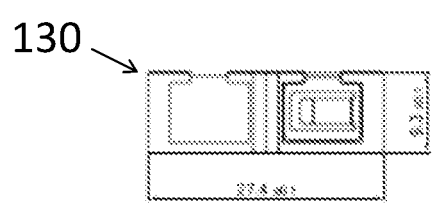
FIG. 11C is a side view of the latchless adapter of FIG. 11A according to aspects of the present disclosure.
Figure 11D:
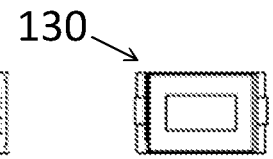
FIG. 11D is a front view of the latchless adapter of FIG. 11A according to aspects of the present disclosure.
Figure 11E:
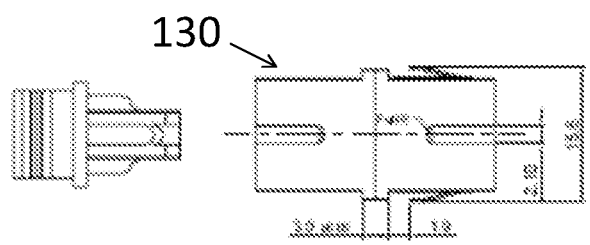
FIG. 11E is a top view of the disassembled latchless adapter of FIG. 11A according to aspects of the present disclosure.

FIGS. 11A to 11E show various view of the adapter 130. FIG. 11A is a top view of the latchless adapter 130. FIG. 11B is a rear view of the latchless adapter 130. FIG. 11C is a side view of the latchless adapter 130. FIG. 11D is a front view of the latchless adapter 130. FIG. 11E is a top view of the disassembled latchless adapter 130.

Figure 12:
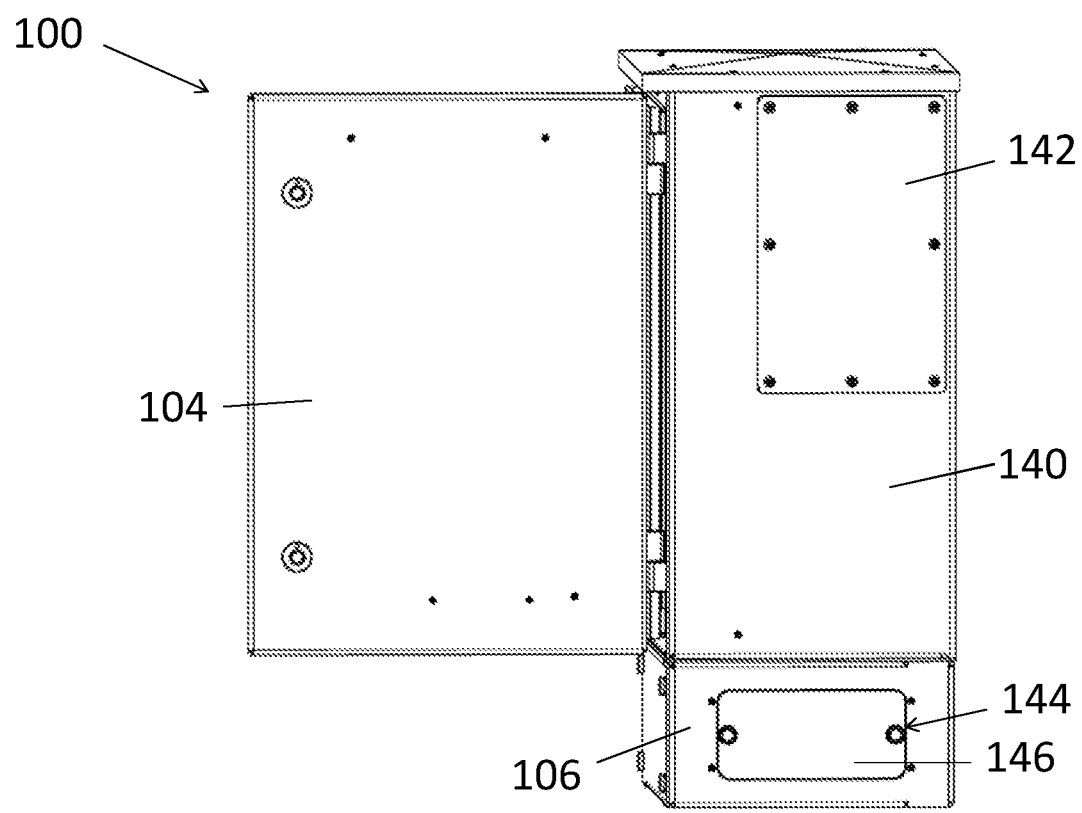
FIG. 12 is a side view of the cabinet of FIG. 1 according to aspects of the present disclosure.

FIG. 12 is a side view of the cabinet 100 located on the riser 106, showing the side panel 140. The side panel 140 includes an opening covered by a removable door 142 to allow access to the interior of the cabinet 100 from the side. For example, the side opening may allow access to the rear of the cabinet and splice trays positioned within the cabinet. In some embodiments, the door 142 may be coupled to the housing rather than being removable. In some embodiments, the door 142 may be hinged or coupled to the housing using other coupling means.

The riser 106 that is separate from the cabinet 100 includes a ground locate box 144. The ground locate box 144 includes a grounding interface having a plurality of grounding terminals for grounding cables and the housing without accessing the cabinet 100. The ground locate box 144 has a removable door 146 to allow access to the grounding interface within the ground locate box. The door 146 may be coupled to the riser rather than removable. The door 146 may be hinged or coupled to the riser using another coupling means.

Figure 13:
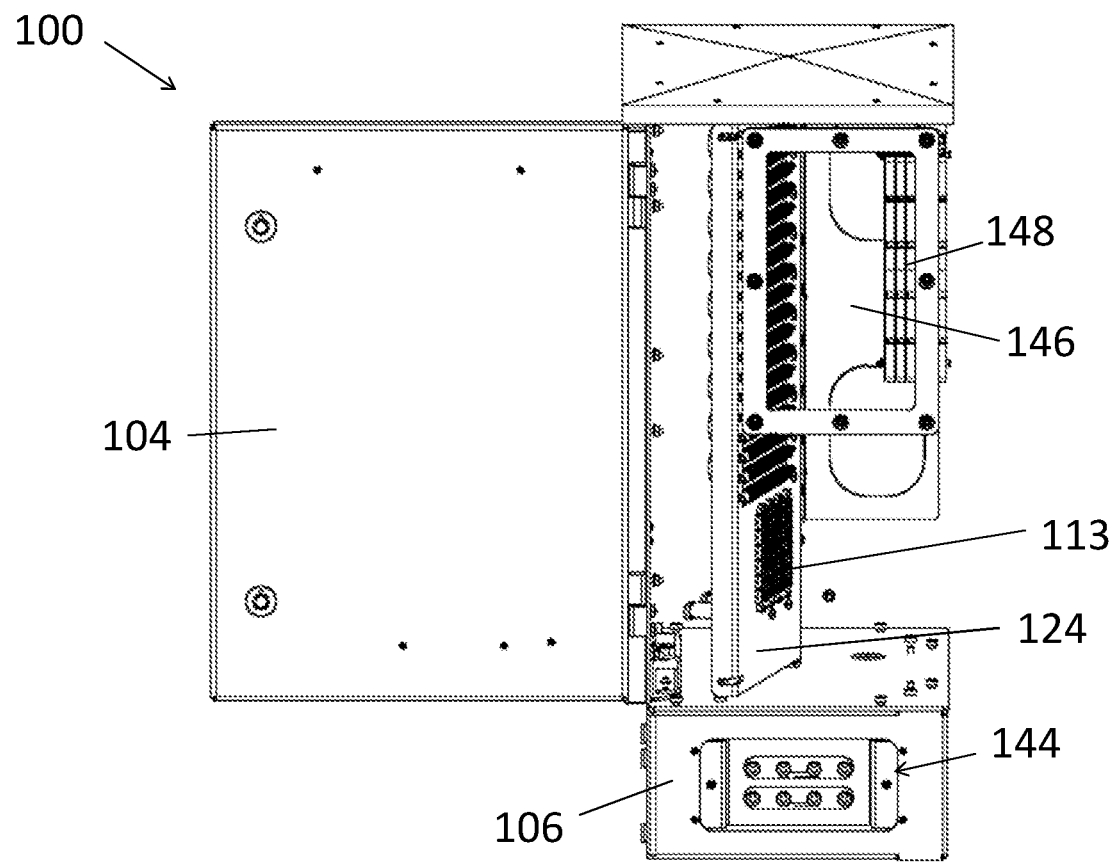
FIG. 13 is a side view of the cabinet of FIG. 1 with the side panel removed to show the interior according to aspects of the present disclosure.
Figure 14:
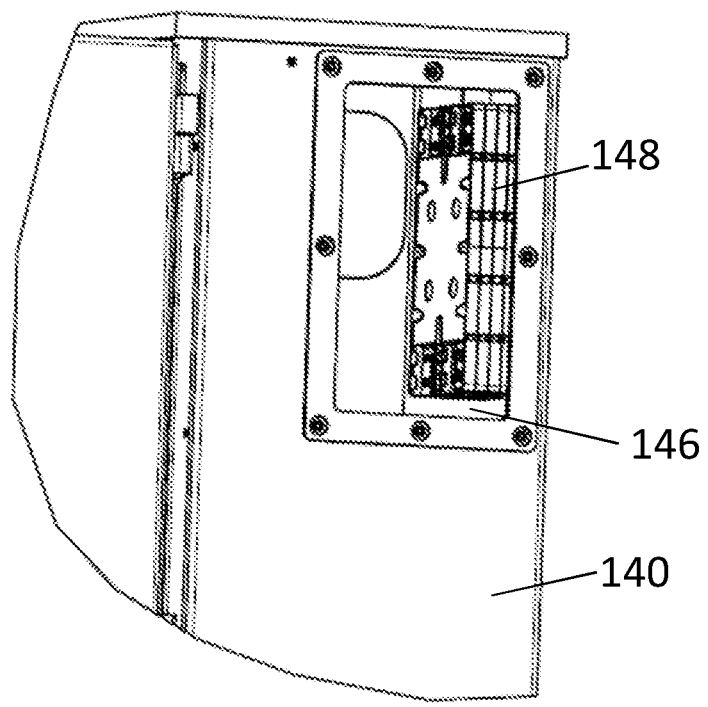
FIG. 14 is a side view of the cabinet of FIG. 1 showing access from the side according to aspects of the present disclosure.

FIG. 13 is a side view of the cabinet 100 with the side panel 140 and the door 142 removed to show the interior of the cabinet. The interior of the cabinet includes bulkhead 124 that has a staging area 113. The bulkhead 124 is angled, as shown in FIG. 13, to allow access to the rear of the cabinet 100. The door 142 has been removed to reveal the side opening 146 that allows access to the rear of the cabinet 100. For example, a splice tray 148 positioned at the rear of the cabinet may be easily accessed via the side opening 146. The door 146 of the ground locate box 144 is also removed, further showing the grounding interface on the side panel of the riser 106. FIG. 14 is another side view of the cabinet 100, showing access from the side opening 146 to the splice tray 148 located at the rear of the cabinet.

Figure 15:
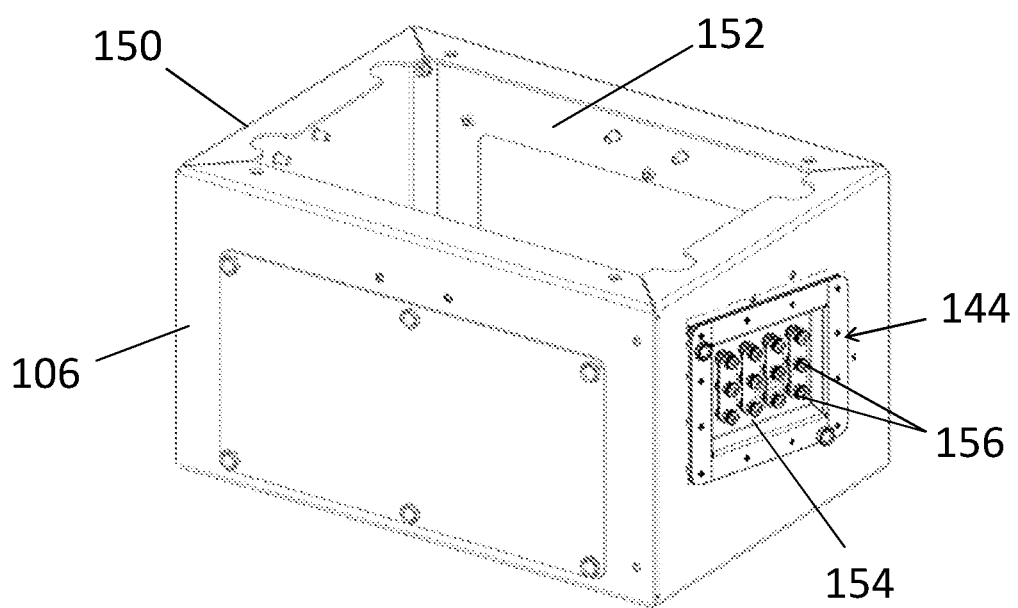
FIG. 15 is a perspective view of the riser having a ground locate box according to aspects of the present disclosure.

FIG. 15 is a perspective view of the riser 106. The riser 106 comprises a housing 150. The housing 150 may include a plurality of panels forming sides of the riser 106 and is configured to couple to the cabinet 100. The top of the riser 106 has an opening 152 to allow access to the ground locate box 144 of the riser from the interior of the cabinet 100. One side of the riser 106 has the ground locate box 144. The ground locate box 144 has a grounding interface 154 comprising a plurality of grounding terminals 156. The grounding terminals 156 may be configured to ground cables connected thereto and to ground the housing 150 without accessing the cabinet 100.

Figure 16:
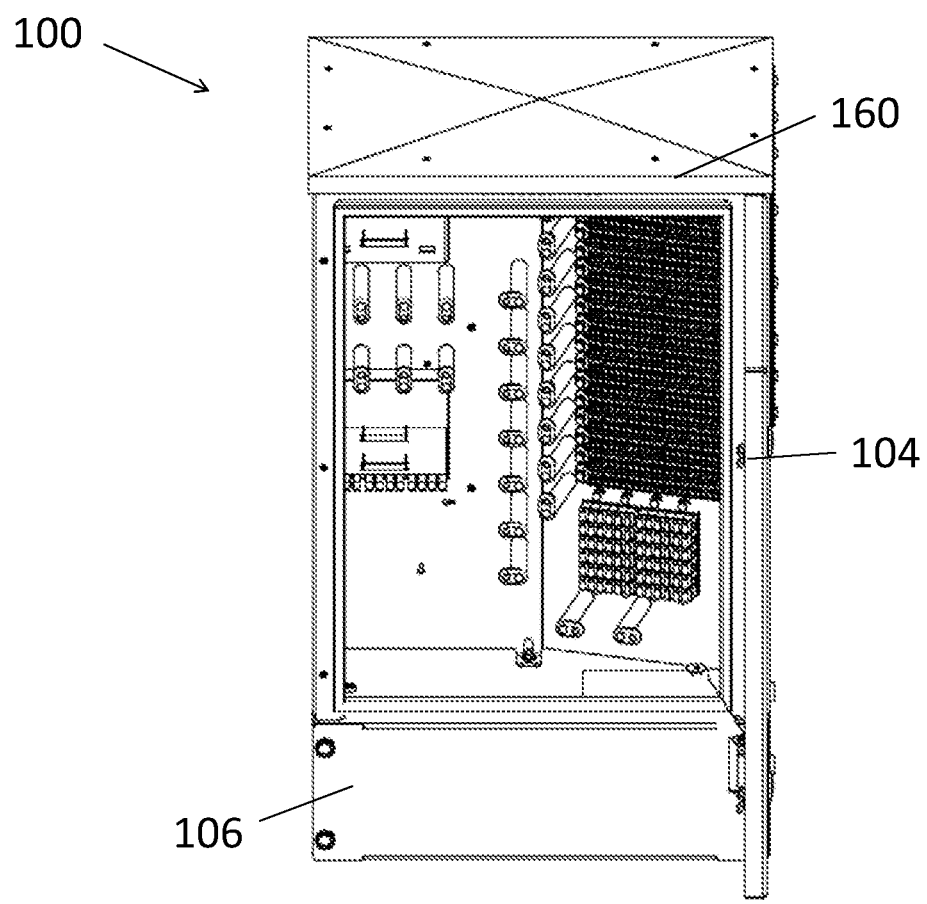
FIG. 16 is a perspective top view of the cabinet of FIG. 1 according to aspects of the present disclosure.
Figure 17:
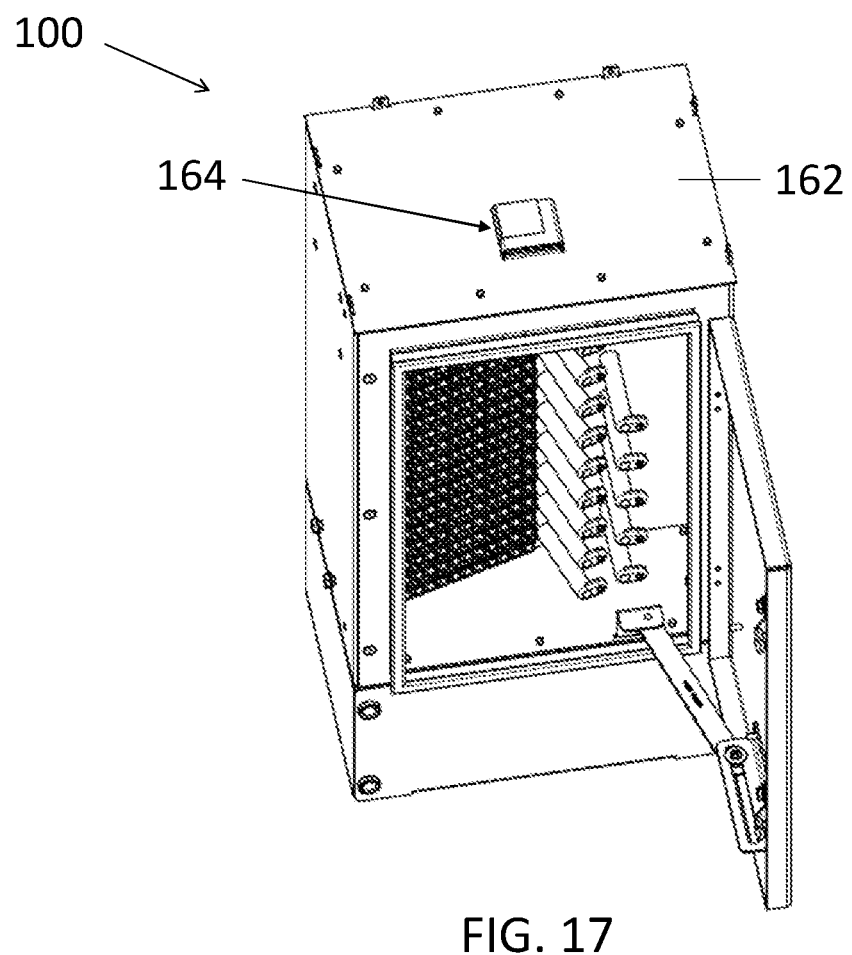
FIG. 17 is a perspective top view of the cabinet of FIG. 1 with the top cover removed according to aspects of the present disclosure.

FIG. 16 is a perspective top view of the cabinet 100, further showing the roof or the top cover 160 of the cabinet. In various embodiments, the vent and filter may be hidden in the roof of the cabinet. In various embodiments, the top cover 160 may be removed, as shown for example in FIG. 17. Removing the top cover 160 reveals the inside top panel 162 of the cabinet. The top panel 162 includes a compartment 164 for receiving the filter.

Figure 18A:
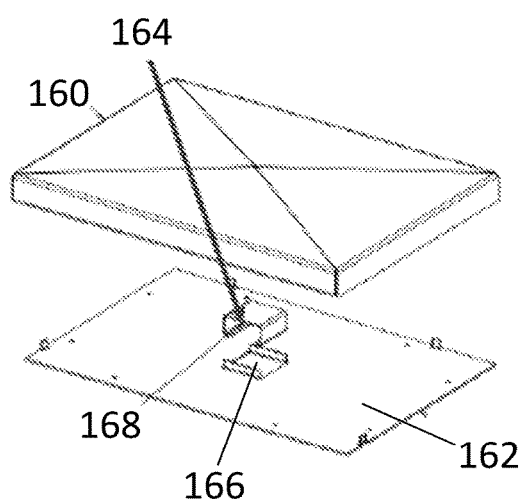
FIG. 18A is a perspective view of the top portion of the cabinet of FIG. 1 showing the filter compartment according to aspects of the present disclosure.
Figure 18B:
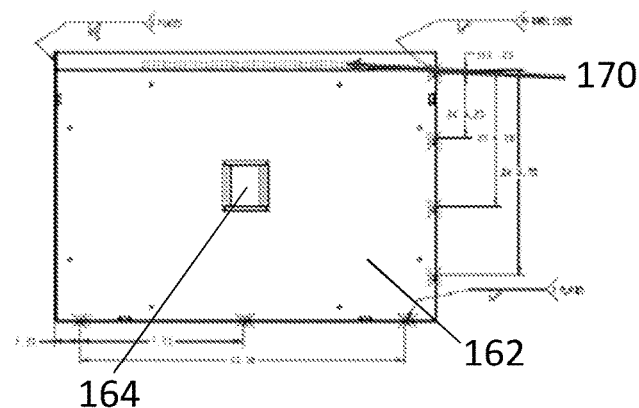
FIG. 18B is a top view of the cabinet of FIG. 1 with the top cover removed, showing vent holes according to aspects of the present disclosure.
Figure 18C:
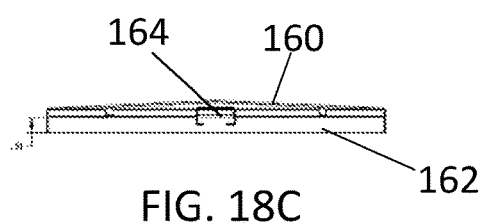
FIG. 18C is a cross-sectional side view of the top portion of the cabinet of FIG. 1 showing the filter compartment according to aspects of the present disclosure.

FIG. 18A is a perspective view of the top portion of the cabinet 100, showing the location of the filter compartment 164. The filter compartment 164 may comprise a first portion 166 coupled to the top panel 162 and a second portion 168 that may be removable. In other embodiments, the filter compartment may comprise a single housing. FIG. 18B is a top view of the cabinet 100 with the top cover 160 removed, further showing vent holes 170 hidden within the roof. FIG. 18C is a cross-sectional side view of the top portion of the cabinet 100, showing the filter compartment 164 hidden within the roof of the cabinet between the top panel 162 and the top cover 160.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiment.

The invention claimed is:

1. A latchless adapter comprising:
an adapter frame;
a ferrule positioning portion, wherein the ferrule positioning portion is positioned within an interior of the latchless adapter, thereby separating the interior into a first compartment at a first end of the latchless adapter and a second compartment at a second end of the latchless adapter, each of the first and the second compartments configured to receive a respective connector; and a spring clip located on an exterior of the adapter frame and configured to couple the latchless adapter to an external frame.

2. The latchless adapter of claim 1, wherein the ferrule positioning portion comprises a first portion and a second portion, each of the first portion and the second portion comprising a cylindrical portion with a flat portion at an end of the cylindrical portion, wherein the flat portion of the first portion and the flat portion of the second portion are configured to mate.

3. The latchless adapter of claim 1, wherein the adapter frame is without connecting locking pins.

4. The latchless adapter of claim 1, wherein the ferrule positioning portion is a single integral piece.

* * * * *